United States Patent [19]

Zeuner et al.

[11] Patent Number: 4,471,940
[45] Date of Patent: Sep. 18, 1984

[54] DASHPOT ASSEMBLY

[75] Inventors: Kenneth W. Zeuner, New Hope; Alonzo B. Jarman, Wrightstown, both of Pa.

[73] Assignee: TRW, Inc., Euclid, Ohio

[21] Appl. No.: 366,370

[22] Filed: Apr. 7, 1982

Related U.S. Application Data

[62] Division of Ser. No. 226,689, Jan. 21, 1981, Pat. No. 4,345,736.

[51] Int. Cl.³ .................... F16K 21/02; F16K 31/122
[52] U.S. Cl. ......................................... 251/51; 251/47
[58] Field of Search ................. 251/30, 47, 48, 50, 251/51

[56] References Cited

U.S. PATENT DOCUMENTS

| | | | |
|---|---|---|---|
| 132,523 | 10/1872 | Cooper | 251/51 |
| 506,221 | 10/1893 | Gilcher | 251/51 |
| 639,316 | 12/1899 | Turnbull | 251/51 |
| 1,874,793 | 8/1932 | Nightingale et al. | 251/50 |
| 4,239,180 | 12/1980 | Thuries et al. | 251/51 |

Primary Examiner—George L. Walton
Attorney, Agent, or Firm—Ratner & Prestia

[57] ABSTRACT

A dashpot assembly has a movable cylindrical element mounted within a housing. The movable element has a chamber with a first opening for restricting flow of fluid into the chamber and a second opening for permitting rapid flow of fluid out of the chamber. An enlarged head is disposed inside the chamber and is coupled to a poppet with a spring coupled between the poppet and the movable element. When the poppet moves in a direction away from the movable element, the enlarged head closes the second opening and pulls the element. Fluid then flows into the chamber only through the restricted first opening, thereby damping the rate of movement of the poppet. When the poppet moves in a direction toward the movable element, the enlarged head opens the second opening and the spring is effective to move the element in the same direction; fluid flows unrestricted through the second opening, thereby permitting an undamped movement of the poppet.

15 Claims, 7 Drawing Figures

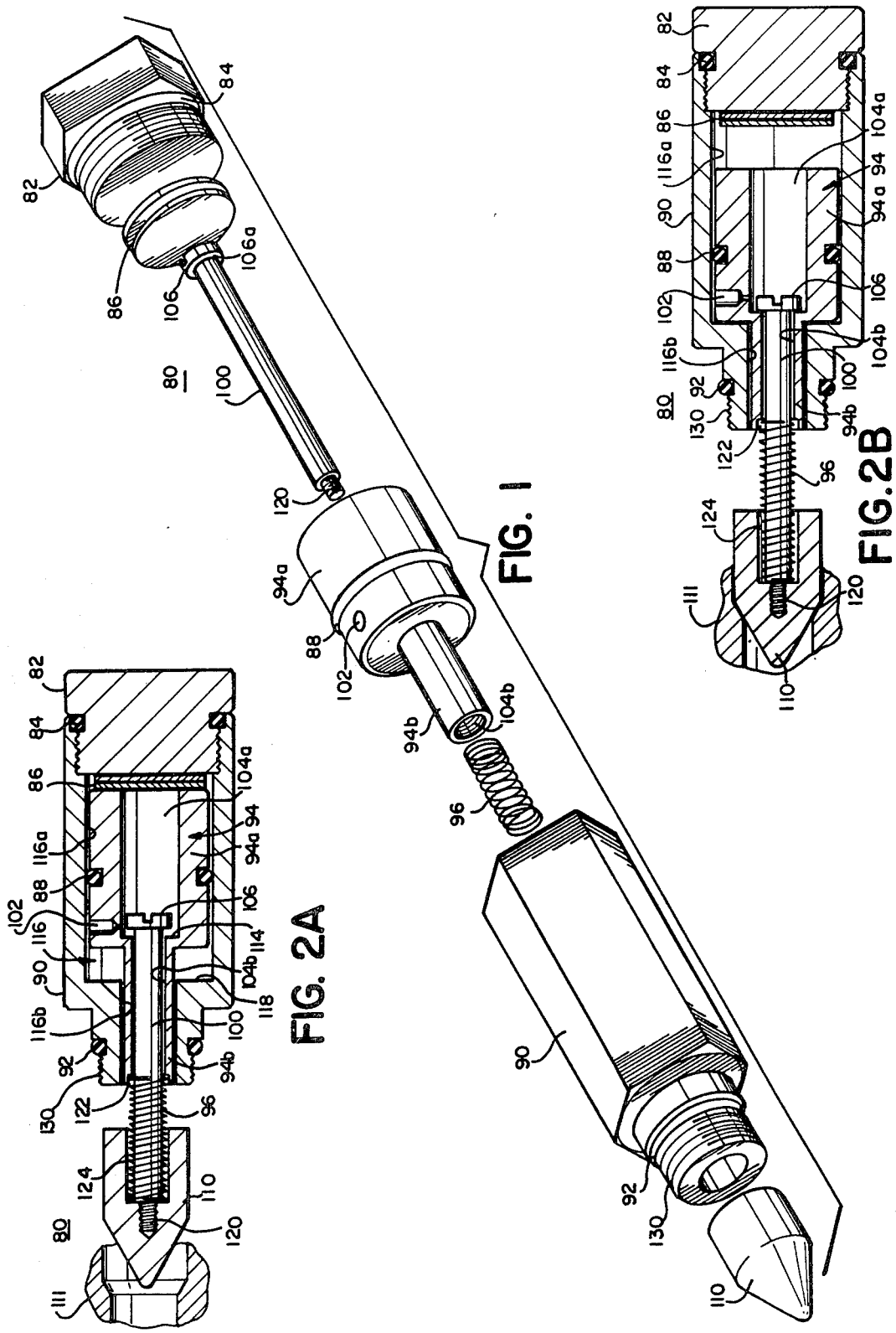

DASHPOT ASSEMBLY

BACKGROUND OF THE INVENTION

This application is a division, of application Ser. No. 06/226,689, filed Jan. 21, 1981, now U.S. Pat. No. 4,345,736.

A. Field of the Invention

This invention relates generally to dashpot assemblies and more specifically to dashpot assemblies used for damping the movement of poppets.

B. Background Art

A problem common to solenoid actuated poppet valves is obtaining proper response to the pressure actuating force to produce the desired control of fluid. Too slow or too fast movement responsive to the applied pressure may result in uncontrolled oscillation, chatter, and generally unacceptable performance. More particularly, poppet valves provide quick opening and closing times but produce rapid fluid changes, which in turn produce abrupt displacement of a mass or load downstream of the valve seat. This abrupt displacement may cause damage to the mass being displaced.

In some applications it is desirable to damp the opening of a valve orifice but permit its rapid closing. As shown, for example, in U.S. Pat. No. 4,202,250, a dashpot assembly controls the movement of a normally closed poppet. When actuated to open, the dashpot is effective to damp the opening of the valve orifice by damping the movement of the poppet. However, when actuated to close, the dashpot permits rapid closing of the orifice.

In some applications the reverse may be desirable. That is, it may be desirable to damp the closing of an orifice but permit its rapid opening. As an example, in an agricultural combine having a heavy header and springy tires, a normally open poppet is actuated to a closed state to start raising the header, but is actuated to the normally open state to stop raising the header. Accordingly, the starting movement of the header must be damped to prevent start shock. On the other hand, once the header reaches to desired height, overshoot must be prevented by rapidly stopping the raising.

Therefore, an object of this invention is to provide a dashpot assembly for damping the movement of a poppet during its actuation to the closed state, but to provide an undamped movement during its actuation back to its open state.

SUMMARY OF THE INVENTION

A dashpot assembly is provided for a poppet and comprises an element mounted in a fluid-filled housing for movement in each of two opposite directions. The movable element has formed in it first and second openings through at least one of which fluid must flow to permit movement of the movable element in either of the opposite directions within the housing. The first opening permits through it only a restricted flow of fluid and the second opening permits through it a relatively large and rapid flow of fluid. There is further provided means for closing the second opening and for following movements of the poppet. Upon movement of the poppet in a first direction the closing means also (a) causes the movable element to follow movements of the poppet by moving in one of said opposite directions in the housing and (b) closes the second opening to permit restricted fluid flow only through the first opening in the movable element. In this manner, the movement of the movable element and the poppet is damped. Upon movement of the poppet in a second direction the closing means is effective to open the second opening to permit rapid fluid flow through the second opening and thereby to permit relatively undamped movement of the movable element and poppet.

BRIEF DESCRIPTION OF THE DRAWINGS

FIG. 1 is an exploded perspective view of the dashpot assembly of the present invention;

FIG. 2A is a sectional view of the dashpot assembly of FIG. 1 with the poppet moved toward the movable element of the dashpot assembly;

FIG. 2B is a sectional view of the dashpot assembly of FIG. 1 with the poppet moved away from the movable element of the dashpot assembly;

DESCRIPTION OF THE PREFERRED EMBODIMENT

Figure 3:
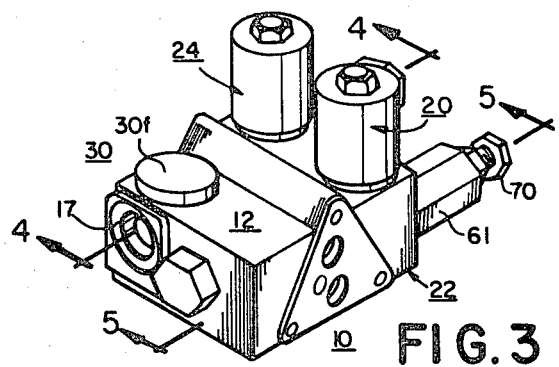
FIG. 3 is a perspective view of a valve system having a pair of two stage valve assemblies embodying the present invention.

Referring now to FIGS. 1, 2A and 2B, there is shown a dashpot assembly 80 for controlling the movement of a poppet 110. Dashpot assembly 80 comprises cylindrical element 94 slidably mounted within a housing 90. Poppet 110, it will be understood, is a conventional poppet which can be actuated to close or open an orifice 111 of a fluid circuit (not shown). When moving in a direction away from movable element 94, poppet 110 tends to close the orifice; when moving in a direction toward movable element 94, the poppet tends to open the orifice. As will be explained in detail, dashpot assembly 80 is effective to damp the rate of movement of poppet 110, when the poppet is moving to the left in a direction away from movable element 94; dashpot assembly 80, however, permits an undamped movement of poppet 110, when the poppet is moving to the right in a direction toward movable element 94.

More particularly, housing 90 comprises an elongated member having at one end a decreased outer diameter externally threaded extension 130 which is adapted to be threaded into a complementary internally threaded port of a fluid circuit (not shown).

Housing 90 has inner bore 116 formed in two sections. A first of the sections defines a decreased inner diameter tubular chamber 116b disposed adjacent poppet 110. Chamber 116b opens into an increased inner diameter tubular chamber 116a which is remote from the poppet. A radially directed inner wall 118 connects the inner walls of chambers 116a, b. Movable element 94 defines a first section 94b of decreased outer diameter which is movably received within chamber 116a. A second section 94a has an increased outer diameter which is movably received within chamber 116a.

Section 94a of element 94 has an inner tubular chamber 104a remote from poppet 110 which decreases in inner diameter to form a tubular chamber 104b for section 94b. An inner radial wall 114 connects the inner walls of chambers 104a and 104b and defines an opening between the chambers. The other ends of both chambers are also open.

A connecting rod 100 has threads 120 at one end which threadedly engage poppet 110. The other end of rod 110 extends through chamber 104b and terminates in an enlarged head 106 disposed within chamber 104a. The outer diameter of rod 100 and the inner diameter of chamber 104b are selected so that fluid may easily flow through the channel formed between rod 100 and chamber 104b so long as head 106 is positioned away from wall 114 as illustrated in FIG. 2A. Head 106 has a substantially larger outer diameter than the diameter of channel 104b. Inner surface 106a of head 106 facing wall 114 is flat thereby to provide a sealing surface when surface 106a engages wall 114 as shown in FIG. 2B. Accordingly, when poppet 110 moves to the left, surface 106a of head 106 engages wall 114 thereby pulling element 94 to the left toward poppet 110 and closing the opening into chamber 104b.

Section 94a has a radially extended restricted opening 102 which couples chamber 104a and chamber 116a. A conventional O-ring 88 is provided within an outer groove of element 94a to sealingly engage the inner wall of chamber 116a. Seal 88 is disposed between restricted orifice 102 and the end of element 94 remote from poppet 110. Accordingly, when element 94 is driven to the left by head 106, fluid flows from the chamber formed between element 94 and wall 118 solely through restricted opening 102 and into chamber 104a. In this manner, opening 102 provides a metered flow of fluid into chamber 104a when element 94 is moved to the left with chamber 104b closed.

It will now be understood that when poppet 110 moves in a direction away from movable element 94, enlarged head 106 engages wall 114 and covers the opening into chamber 104b and then pulls element 94 to the left. In this manner, three important functions are provided by head 106. The first function is the engaging of inner wall 114, the second is the closing of chamber 104b and the third is the moving of element 94.

A spring 96 is disposed around rod 100 and between section 94b and poppet 110. Specifically, spring 96 has its right-hand end received within a recess formed in section 94b and its left-hand end disposed within an extended recess within poppet 110. When poppet 110 moves to the right toward element 94, spring 96 is effective to push element 94 to the right toward end cap 82.

The right-hand end of housing 90 is sealed by an end cap 82 threadedly engaged within the housing and engaging a sealing O-ring 84. In order to adjust the extreme right-hand movement of element 94 away from poppet 110, there are provided shims 86 disposed on the inner wall of end cap 82. The shims are held in place on the inner wall by the fluid (action of adhesion). It will be understood that the left travel of element 94 in a direction towards poppet 110 is determined by wall 118. Further, the length of section 94b is selected to provide a stabilized axial guide for rod 100 as it moves within chamber 104b.

In considering in detail the operation of dashpot assembly 80, FIG. 2A shows movable element 94 in its rightward most position. It will be understood that in this position poppet 110 is in its valve open position. In conventional manner, upon actuation of poppet 110 toward its closed position by the fluid circuit the poppet begins its movement in a direction to the left away from movable element 94. Accordingly, enlarged head 106 moves by way of connecting rod 100 to engage inside wall 114 and close chamber 104b. As poppet 110 continues moving to the left, head 106 begins to move element 94 to the left. Since the only opening to chamber 104a from the fluid circuit and chamber 116 is through restricted opening 102, fluid from chamber 116 is metered through this opening into chamber 104a. Thus, the movement of element 94 in a direction toward inside wall 118 is damped by the rate of fluid flow through restricted opening 102. Consequently, poppet 110 is also damped in its valve closing movement in a direction to the left. Damping continues until poppet 110 is fully seated in the position shown in FIG. 2B.

Upon actuation of poppet 110 toward its normally open position by the fluid circuit, the poppet begins its movement to the right toward movable element 94 starting from the position shown in FIG. 2B. Accordingly, enlarged head 106 moves to uncover the opening into chamber 104b. As poppet 110 continues moving to the right, spring 96 is compressed and begins to exert a sufficient force to move element 94 in a direction away from inside wall 118 and away from poppet 110. As element 94 moves, fluid inside chamber 104a begins to easily flow through chamber 104b into the fluid circuit. Accordingly, element 94 moves in an undamped manner until poppet 110 stops or until element 94 is stopped by shims 86 as shown in FIG. 2A. Thus, poppet 110 moves to the right only against spring force without damping by element 94. In this manner poppet 110 and dashpot assembly 80 are recocked for succeeding operations.

It will be noted that when poppet 110 begins its travel from the valve fully open position shown in FIG. 2A in a direction away from movable element 94, damping does not begin until after enlarged head 106 has engaged inside wall 114 and closed chamber 104b. In the example shown in FIG. 2A, head 106 is positioned approximately 1/16 inch away from inside wall 114, and thus poppet 110 will move 1/16 inch without any damping. The reason for this initial undamped movement of poppet 110 will be explained later. Such 1/16 inch positioning may be varied by adjusting the biasing of spring 96. Specifically, when poppet 110 moves to the right, the amount of compression of spring 96 may be adjusted to vary the travel of the poppet before the spring exerts sufficient force to move element 94. After the predetermined amount of compression has been reached, spring 96 begins to move element 94 in the same direction. In this example, the amount of compression has been predetermined to permit head 106 to be 1/16 inch from inside wall 114 during poppet reset.

In summary, after an initial undamped movement of poppet 110, head 106 engages inside wall 114 and closes chamber 104b. Subsequently, poppet 110 is damped in its travel until it is fully seated in and closes orifice 111. When actuated to its normally open position, poppet 110 is permitted to move in an undamped manner until it is returned to its normal position. The poppet and dashpot are recocked automatically for succeeding operations.

It will be understood that dashpot assembly 80 is effective in its operation with any shape or type of poppet assembly. Thus, the above operation is effective with a valve assembly such as that described in Ser. No. 05/842,264 and U.S. Pat. No. 3,980,002, which are incorporated herein by reference.

Figure 4:
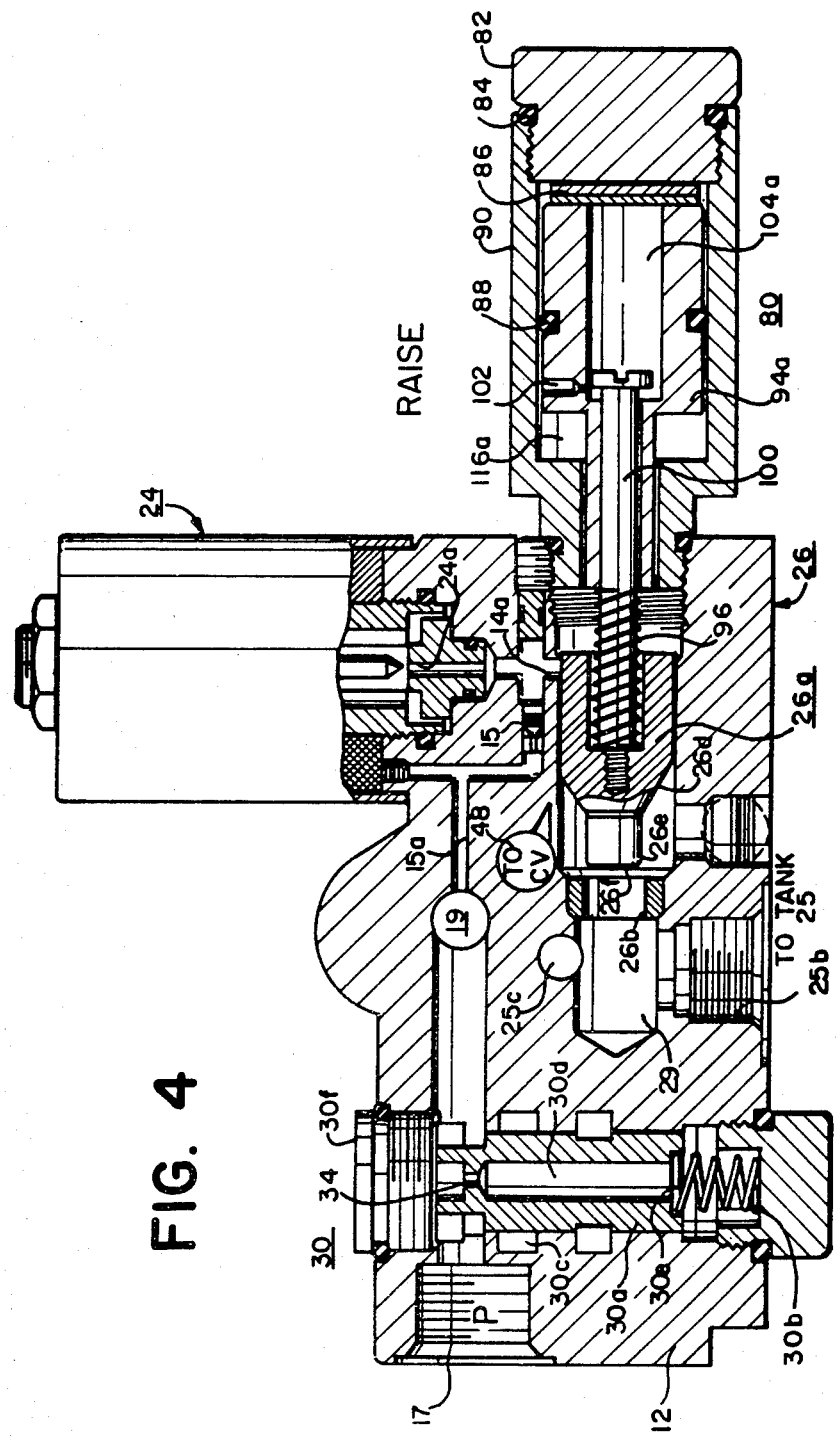
FIG. 4 is a sectional view of the valve system of FIG. 3 taken along lines 4—4.
Figure 5:
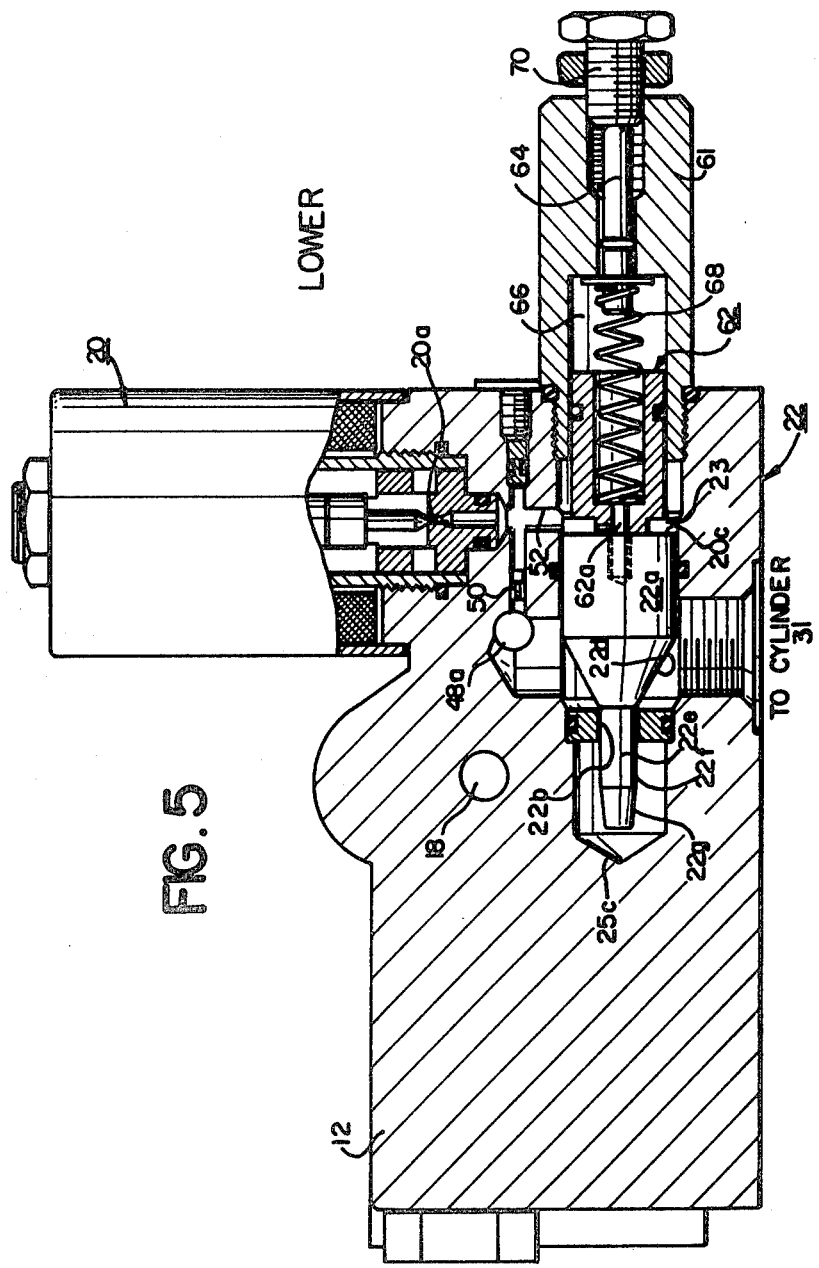
FIG. 5 is a sectional view of the valve system of FIG. 3 taken along lines 5—5.

To better understand the advantages of the present invention, its operation in conjunction with a valve system used for positioning control of a heavy header load in an agricultural combine will now be described. Referring to FIGS. 3-6, there is shown an automatic positioning control valve system 10 for hydraulically moving load 35, a header for a combine, through a predetermined distance. Valve system 10 includes a two stage raise valve assembly having first stage solenoid operated pilot valve 24 and second stage 26. In addition, valve system 10 includes a two stage valve assembly for lowering the load comprising first stage solenoid operated pilot valve 20 and second stage 22. Pilot valve 20 is shown as a normally closed solenoid operated valve and is described in detail, for example, in U.S. Pat. No. 3,737,141 which is incorporated herein by reference. Pilot valve 24 is shown as a normally open solenoid operated valve and is described in detail, for example, in U.S. Pat. No. 3,765,644, incorporated herein by reference. Second stage 26, as shown in FIG. 4 comprises poppet 26a controlled by dashpot assembly 80, of FIG. 1. Second stage 22, as shown in FIG. 5, includes poppet 22a controlled by dashpot assembly 62.

Figure 6:
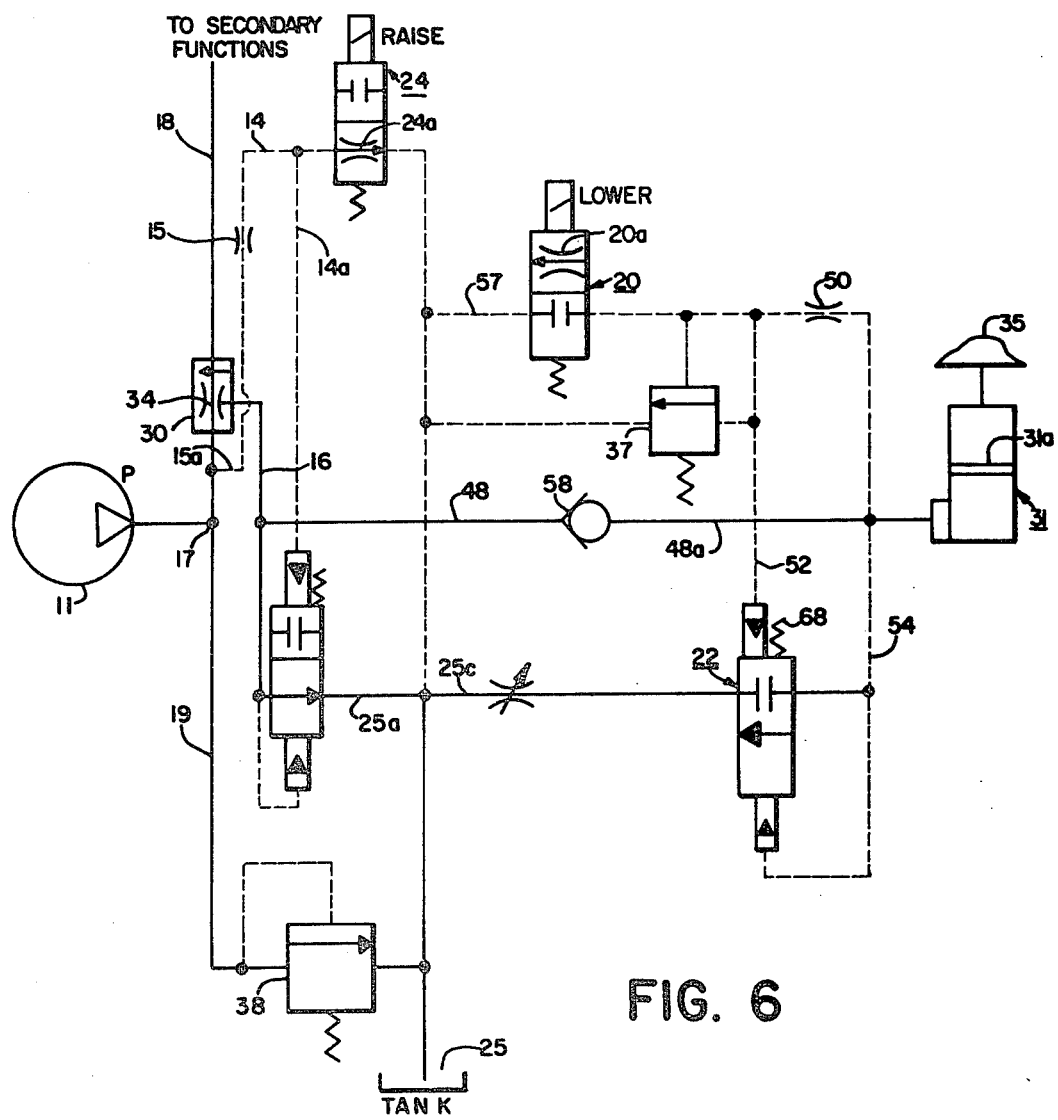
FIG. 6 is a schematic drawing of the valve system of FIG. 3 and further includes an unbalanced load and a pump.

In the quiescent or idle state, as shown in FIG. 6, raise pilot 24 and lower pilot 20 are deenergized and are in their illustrated normally open and normally closed states, respectively. Accordingly, second stage valves 26 and 22 are respectively open and closed. Pressure is maintained across flow divider 30 at a predetermined value, such as approximately 50 psi, and applied to pilot line 15a. With large orifice 24a open, pressure in line 14 is maintained at a very low value and thus second stage 26 is maintained with poppet 26a fully open. Specifically, poppet 26a has a stub or blunt nose end 26f which is shown in FIG. 4 to the right of second stage orifice 26b by about 1/16 inch, for example, to provide a substantially large opening in the idle state.

If it is necessary to raise header 35 to avoid an obstacle, immediate response is available. Specifically, when valve 24 is electrically actuated from the open to the closed state, the 50 psi back pressure on pump 11 is immediately available and provides an instantaneous initial response through lines 15a, 14 and 14a to the pilot of valve 26. As a result of the availability of the 50 psi at line 15a, poppet nose end 26f begins its undamped but short travel toward orifice 26b, as already mentioned, and there is an initial rapid pressure rise. The unloading of pump 11 continues until nose end 26f travels to a point about even with the right side of orifice 26b. The undamped travel of poppet 26a is stopped as a result of head 106 engaging the inside wall of element 94, as already mentioned. Thus, poppet 26a travels rapidly for 1/16 inch distance, for example, to the left without restriction. At that time, the pressure increases to a static load or pressure balance and check valve 58 opens with fluid under pressure being applied to cylinder 31.

The purpose for the initial short but rapid travel to the left by poppet 26a is to minimize "dead time". It will be understood that "dead time" is defined as the time from actuation of pilot 24 until the time of pressure balance when fluid is first applied under pressure to cylinder 31. Since movement of header 35 does not occur until the end of this dead time, it is an advantage that dead time be substantially short.

After pump 11 becomes loaded at the balance pressure, poppet 26a goes through a major portion of the stroke where the stroke is controlled by the damping of dashpot assembly 80. The manner in which dashpot assembly 80 damps poppet 26a has already been described. During this time, the start raise shock is effectively minimized as a result of this damping. In addition, during this time, the start raise shock is minimized as a result of the parabolic contour of section 26e which provides a constant acceleration pressure between section 26d and orifice 26b, as described in detail in U.S. Pat. Nos. 3,980,022 and 4,202,250 which are incorporated herein by reference. When poppet 26a reaches its fully closed position, pump 11 remains loaded and the balance pressure continues to raise header 35.

Thus, with pilot 24 energized and second stage 26 closed, pressure is applied to cylinder 31 by way of check valve 58 to raise header 35. At the time the header arrives at a desired position, the raise function is terminated by deenergizing pilot valve 24 which is returned to its normally open state. Since orifice 24a is of substantially large area, it allows a rapid flow of fluid from line 14a through the poppet and then to tank 25. As a result, poppet 26a opens rapidly, since dashpot assembly 80 does not damp any poppet movement to the right, as already described. The rapid opening of orifice 26b causes the speedy unloading of pump 11, thereby to quickly stop the raising of header 35.

In summary, the advantage of the raise section having dashpot assembly 80 is an initial rapid increase in pressure to balance pressure during a relatively small value of dead time. As soon as the pressure balance is achieved, check valve 58 opens and thereafter there is a controlled closing of poppet 26a and substantially linear flow rate change for minimized start raise shock. In this manner, there is a controlled transition from the unload phase to the load phase and as soon as pressure balance is achieved, the shock is controlled. The raise is stopped much faster than the start to prevent overshoot of the header. All this is achieved with the dashpot assembly 80 since it (1) permits an initial undamped poppet movement to the left, followed by a damped movement for the major portion of the stroke, and (2) permits an undamped movement to the right when poppet 26a is returned to its normally open state.

Referring now to FIGS. 4 & 5, valve 30 comprises spool 30a which engages at its lower portion spring 30b and has intermediate openings which communicate with central chamber 30d and with line 18 which is coupled to the secondary functions. Chamber 30d has at its lower end restricted orifice 30e and at its upper end orifice 34. An upper end cap 30f engages the upper end of spool 30a. Under normal circumstances with no hydraulic power required in line 18 or any loading by the raise circuit, fluid flow from pump 11 and inlet 17 causes spring 30b to become compressed and fluid flows into groove 30c and then to bypass line 16. With spring 30b properly selected, the pressure at inlet 17 is maintained at approximately 50 psi. When there is demand for pressure from line 18, fluid flows from inlet 17 through orifice 34 into central chamber 30d and then through orifice 30e to the lower end of the spool. Thus, spool 30a moves upwardly as a function of the priority system pressure on line 18. By maintaining the drop across orifice 34, there is provided a constant flow to the secondary functions with flow divider 30 effectively operating as two sources of pressure that can be independently pressurized.

In the manner previously described, load 35 is raised during the time of energization of the solenoid of valve 24. Upon deenergization of this solenoid, the idle or quiescent state is resumed and pump 11 is again unloaded. In the idle state, pilot valve 20 is closed and high pressure oil freely passes through restriction 50 and line 52 so that full pressure from cylinder 31 is available in chamber 23 to the right of poppet 22a, as shown in FIG. 5. In this manner, second stage lower valve 22 is maintained in the illustrated closed position.

Upon energization of the solenoid of pilot valve 20, there is provided flow through the orifice thereof and by way of pilot line 57 to tank 25. In this manner, there is established a flow across orifice 50. Accordingly, the pressure in chamber 23 is decreased and the system pressure in line 54 is effective to move poppet 22a away from orifice 22b and allow fluid to flow from cylinder 31 through line 54, line 25c and then to tank 25.

The rate of opening of poppet 22a is dampened by dashpot assembly 62 which operates in the following manner. When poppet 22a moves to the right away from orifice 22b, the right hand face 22c thereof pushes against the left hand face of dashpot cylinder 62b. Dashpot cylinder 62b is spring biased by spring 68 secured at its right hand end to adjustable plunger 64. Assembly 62 has a chamber 66 within which fluid is compressed. Fluid is released from chamber 66 by way of a flow restriction 60a, into chamber 23. As that fluid is released, poppet 22a is thus restricted in the speed it opens or moves to the right away from orifice 22b. Accordingly, dashpot assembly 62 is effective to restrict and dampen the opening of poppet 22a thereby to dampen the lowering of header 35.

It will be understood that there is no restriction on the closing of poppet 22a since as poppet 22a moves to the left, it is free to separate from dashpot cylinder 62b. When these elements separate, fluid is allowed to freely flow from chamber 23 through unrestricted conduit 62a into chamber 66. In this manner, spring 68 is effective to reset dashpot assembly 62 for the next open command to lower header 35.

It will now be understood that the opening of poppet 22a and the resultant lowering of header 35 is dampened by means of dashpot assembly 62. During this time, the start lower shock is effectively minimized as a result of the damping of the dashpot. Additionally, the parabolic contour of sections 22e-g provides a substantially linear flow rate change between the sections and orifice 22b.

When poppet 22a reaches its fully open position, header 35 continues to lower until poppet 20 is deenergized. At that time, poppet 20 returns to its normally closed state and poppet 22a unrestricted by damping assembly 62 rapidly closes to prevent undershoot of header 35.

It will further be understood that both poppets 22a and 26a each have substantially parabolic contours 22e-g and 26d, respectively, each having an outer, smooth, imperforate and continuous surface. Further, orifices 15, 24a, 20a and 50 may be considered fixed flow restricting orifices having precalculated and non-variable dimensions. For poppet 22a which is always disposed within orifice 22b, the dimensions of parabolic contour 22e-g, second stage orifice 22b and orifices 20a and 50 are chosen in predetermined relations for providing the substantially linear flow rate change, particularly with respect to opening of the valve as previously described. In this manner, there is provided a constant acceleration in lowering of header 35. With respect to poppet 26a, the dimensions of contour 26e, orifice 26b and orifices 15 and 24a are chosen in a predetermined relation for providing the substantially linear flow rate change from the time of pressure balance until poppet 26a closes. In this manner, there is a constant acceleration in raising header 35.

What is claimed is:

1. A dashpot assembly for a poppet comprising a fluid-fillable housing,
    an element mounted in the housing for movement in each of two opposite directions, the movable element having formed in it a fixed volume chamber and first and second openings, the first and second openings in the movable element providing passageways between the chamber and the exterior of the movable element through at least one of which said openings fluid must flow to permit movement of the movable element in either of said two opposite directions within the housing, the first opening in the movable element permitting through it only a restricted flow of fluid and the second opening in the movable element permitting through it a relatively large and rapid flow of fluid, biasing means positioned between and in contact with both said movable element and said poppet for coupling and maintaining a predetermined minimum spacing between the poppet and the movable element for causing the movable element to follow movement of the poppet in a second direction and
    means for closing the second opening and for following movements of the poppet, said closing means upon movement of the poppet in a first direction also (a) causing the movable element to directly follow the first direction movement of the poppet and (b) closing the second opening to permit restricted fluid flow only through the first opening in the movable element and thereby to damp the first direction movement of the movable element and the poppet, said closing means upon movement of the poppet in the second direction through said biasing means for opening the second opening to permit rapid fluid flow through the second opening as said movable element follows the poppet movement in the second direction by way of the biasing means to thereby permit relatively undamped movement of the movable element and poppet in the second direction.

2. The dashpot assembly of claim 1 wherein the closing means includes a sealing surface presented toward the second opening for engaging the surface of the chamber in the movable element and closing the second opening.

3. The dashpot assembly of claim 2 wherein the biasing means also maintains a predetermined maximum spacing between the sealing surface of the closing means and the surface of the chamber in the movable element which circumscribes the second opening.

4. The dashpot assembly of claim 1 wherein said closing means is rigidly affixed to said poppet, whereby the movement of said closing means directly follows the movement of said poppet in either of said two opposite directions.

5. A dashpot assembly for a poppet comprising a movable element mounted within a housing, said movable element having a fixed volume chamber within it and a first opening, said first opening in said movable element providing a passageway between the chamber and the exterior of the movable element for allowing restricted flow of fluid into said chamber, a second opening in said movable element providing a passageway between the chamber and the exterior of the movable element for permitting rapid flow of fluid out of said chamber, biasing means positioned between and in contact with both said movable element and said poppet for coupling and maintaining a predetermined minimum spacing between the poppet and the movable element for causing the movable element to follow movement of the poppet in a direction toward said movable element and closing means, partially disposed within said chamber and immovably affixed with respect to said poppet, for directly following movements of said poppet, said closing means having an enlarged section (1) for closing said second opening and pulling said movable element toward said movable element, whereby said fluid flows into said chamber only through the restricted first opening for damped movement of said poppet, and (2) for opening said second opening and moving said movable element by way of the biasing means when said poppet moves in a direction towards said movable element thereby permitting rapid flow of fluid out of said chamber for undamped movement of said poppet.

6. The dashpot assembly of claim 5 in which said closing means enlarged section includes a sealing surface facing said second opening for engaging and closing said second opening when said poppet moves in a direction away from said movable element.

7. The dashpot assembly of claim 6 in which said biasing means includes a spring having a predetermined value of bias to push said movable element in a direction away from said poppet while maintaining a preselected distance between the enlarged section sealing surface and the second opening, said biasing means additionally for causing said poppet and said movable element to move undamped when said poppet initially moves in the direction away from said movable element.

8. The dashpot of claim 7 in which said housing includes a first chamber disposed adjacent said poppet and a second chamber remote from said poppet, said first and second chambers interconnected, said movable element having a first section received within said first chamber and a second section movably received within said second chamber, said second opening formed between said first section and the surface of said first chamber.

9. The dashpot assembly of claim 8 in which the closing means also includes a connecting member directly connected at one end to the poppet, said connecting member extending through said second opening and terminating at its other end in said closing means enlarged section, said connecting member having a transverse dimension smaller than that of said second opening for permitting fluid to easily flow through said second opening when said enlarged section is positioned away from said second opening.

10. The dashpot assembly of claim 8 wherein said first section has a length sufficient to provide a stabilized axial guide for said connecting member when said connecting member is moved through said second opening.

11. The dashpot of claim 8 further including a seal mounted around the periphery of the second section of said movable element, said seal filling the space between the outer periphery of said second section and the surface of said chamber, said seal longitudinally positioned between said first opening and the noninterconnected end of said second chamber.

12. The dashpot assembly in accordance with claim 8 wherein said housing includes not more than one passageway between the inside and outside of said housing, said closing means passing through said one passageway.

13. The dashpot assembly in accordance with claim 9 wherein said poppet is located completely outside of said housing and is remote from said housing and said second opening.

14. The dashpot assembly of claims 5, 6, or 7 in which said first opening is a restricted opening and extends radially through the periphery of said second section, whereby fluid flows from said second chamber into said movable element's chamber by way of said first restricted opening when said enlarged section engages said second opening and pulls said movable element.

15. The dashpot assembly of claim 5 wherein said biasing means includes a spring, one end of said spring positioned against said poppet, the other end of said spring positioned against said movable element, and wherein said closing means passes through the center of said spring.

* * * * *